(12) United States Patent
Kiefer

(10) Patent No.: US 8,608,222 B2
(45) Date of Patent: Dec. 17, 2013

(54) FUEL TANK COVER AND FUEL TANK COVER MODULE FOR A MOTOR VEHICLE

(75) Inventor: Thomas Kiefer, Frankfurt (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/319,703

(22) PCT Filed: Apr. 3, 2010

(86) PCT No.: PCT/EP2010/002139
§ 371 (c)(1),
(2), (4) Date: Nov. 10, 2011

(87) PCT Pub. No.: WO2011/026533
PCT Pub. Date: Mar. 10, 2011

(65) Prior Publication Data
US 2012/0049566 A1    Mar. 1, 2012

(30) Foreign Application Priority Data
Sep. 2, 2009 (DE) .......................... 10 2009 039 846

(51) Int. Cl.
*B60K 15/05* (2006.01)
(52) U.S. Cl.
USPC ............. 296/97.22; 296/207; 16/375; 49/401
(58) Field of Classification Search
USPC ............. 296/97.22, 207; 16/374, 375; 49/49, 49/138, 400, 401, 402
See application file for complete search history.

(56) References Cited

U.S. PATENT DOCUMENTS 6,189,959 B1 * 2/2001 Van Assche et al. .......... 296/207

FOREIGN PATENT DOCUMENTS

| CN | 201165195 Y | 12/2000 |
| DE | 4125184 A1 | 2/1993 |
| DE | 19645506 A1 | 5/1997 |
| DE | 10338820 A1 | 3/2005 |
| DE | 102005051140 A1 | 5/2007 |
| EP | 0990548 A2 | 4/2000 |
| EP | 1829727 A2 | 9/2007 |
| FR | 2836427 A1 | 8/2003 |

OTHER PUBLICATIONS

German Patent Office, German Search Report for Application No. 102009039046.5, dated Apr. 26, 2010.
International Searching Authority, International Search Report for Application No. PCT/EP2010/002139, dated Sep. 14, 2010.

* cited by examiner

*Primary Examiner* — Dennis Pedder
*Assistant Examiner* — Beverly Becker
(74) *Attorney, Agent, or Firm* — Ingrassia Fisher & Lorenz, P.C.

(57) ABSTRACT

A tank inlet cover module is provided, which is installable in a motor vehicle, and a tank inlet cover mounted so it is pivotable thereon. The tank inlet cover module has a groove body having an end stop for limiting a pivot movement of the tank inlet cover. The tank inlet cover itself has a tank inlet cover body and a counter stop element, which interacts with the stop of the tank groove via a counter stop surface, furthermore, means being provided for damping a structure-borne noise propagation between counter stop element and the tank inlet cover body.

19 Claims, 3 Drawing Sheets

FUEL TANK COVER AND FUEL TANK COVER MODULE FOR A MOTOR VEHICLE

CROSS-REFERENCE TO RELATED APPLICATIONS

This application is a U.S. National-Stage entry under 35 U.S.C. §371 based on International Application No. PCT/EP2010/002139, filed Apr. 3, 2010, which was published under PCT Article 21(2) and which claims priority to German Application No. 102009039846.5, filed Sep. 2, 2009, which are all hereby incorporated in their entirety by reference.

TECHNICAL FIELD

The technical field relates to a tank inlet cover for a tank inlet cover module, which can be installed in a motor vehicle, and a tank inlet cover module equipped with such a tank inlet cover, the tank inlet cover being mounted so it is pivotable on the tank inlet cover module, which is implemented as pot-shaped and insertable into an opening of the vehicle body.

BACKGROUND

Tank modules or tank inlet cover configurations are generally known from the prior art. Thus, for example, a tank inlet cover module which is disclosed in DE 10 2005 051 140 A1, for example, has an approximately pot-shaped groove body, which is essentially constructed from a rigid outer pot part, which is producible by injection molding, and an elastic ground skirt, which is molded onto the pot part.

A groove body expansion, in which a tank inlet cover is fastened so it is pivotable using its pivot arm, is provided on a rear side of the groove body, facing away from the interior of the tank groove thus formed. The groove body and the tank inlet cover have locking elements which correspond to one another diametrically opposite to the pivot axis, which allow locking of the tank inlet cover in its closed position.

In addition, the pivotable tank inlet cover and/or the groove body have stop and counter stop elements, respectively, corresponding to one another, which reach a contact position with one another in particular when the tank inlet cover is transferred into its closed position. In particular the groove-side stop can be implemented in this case as an elastically deformable buffer element, for example, in the form of a stop damper which is made of a comparatively easily deformable elastomer or is manufactured from rubber.

Furthermore, a tank inlet cover configuration having damping means, which are implemented as a cushion and may be extruded on a receptacle pot of the tank inlet cover configuration, is known from DE 103 38 820 A1. However, the damping means described herein are predominantly used as an impact damper upon opening of the tank inlet cover, which is particularly to prevent the tank inlet cover from rebounding.

However, in spite of such damping means which are already provided, comparatively hollow noises, which are particularly irritating to the end-user, sometimes arise in particular when closing a tank inlet cover; this is true in particular if the stop and counter stop elements of tank inlet cover and groove body, which correspond to one another and are situated spaced apart by the pivot axis of the cover, hit one another. The perception of such a stop noise, which often sounds quite hollow, is also even amplified in certain circumstances by the cavity, which is formed by the groove body and functions as a resonance chamber.

Therefore, at least one object is to counteract noise generation occurring during the opening and/or closing of the tank inlet cover. In addition, at least one goal is to provide a tank inlet cover which is improved with respect to its acoustic properties and/or a correspondingly improved tank inlet cover module. The measures for this purpose are to be implemented in a particularly cost-effective way and as much as possible without increased manufacturing or installation outlay. Furthermore, other objects, goals, desirable features and characteristics will become apparent from the subsequent summary and detailed description, and the appended claims, taken in conjunction with the accompanying drawings and this background.

SUMMARY

The tank inlet cover is provided for a tank inlet cover module, which is installable in a motor vehicle and is designed for this purpose. A tank inlet cover groove of the tank inlet cover module is used for the pivotable mounting of the tank inlet cover. The tank inlet cover groove, which typically has a groove body implemented protruding in a pot shape into the interior of the motor vehicle, also has an end stop for limiting a pivot movement of the tank inlet cover. The pivotably mounted tank inlet cover and the groove body and/or its end stop situated thereon are adapted to one another with respect to shaping and positioning in such a manner that stop and counter stop elements of tank inlet cover and tank inlet cover module limit an opening or closing movement of the tank inlet cover when they come into a contact position with one another.

The tank inlet cover itself has a tank inlet cover body, which assumes the function of a pivot arm, has a contour which is typically bent approximately in a S-shape, and is optionally implemented to receive a vehicle body panel, which comes to rest flush with the surface of the vehicle body of the motor vehicle in the closed position of the flap. The tank inlet cover body itself can also function as a vehicle body panel, so that separate fastening of a corresponding panel can be dispensed with.

Furthermore, the tank inlet cover has a counter stop element and means for damping structure-borne noise propagation between counter stop element and the tank inlet cover body. The counter stop element is implemented as comparatively small in comparison to the tank inlet cover body. It is typically the object of oscillation excitation as soon as the tank inlet cover strikes the stop on the groove body side during closing or opening.

Because the counter stop element experiences an impact, which can be described in the form of a time delta pulse, during closing of the flap, for example, a comparatively broadband acoustic frequency spectrum is excited, which results in a clearly perceptible noise, which is often irritating to the end-user, as a function of the resonance properties of the tank inlet cover body and the cavity closable by the tank inlet cover, for example.

The means for damping structure-borne noise propagation between counter stop element and the tank inlet cover body change the acoustic properties of the tank inlet cover, its tank inlet cover body, and the counter stop element in such a manner that an oscillation excitation originating from the counter stop element is only still transmitted to a significantly lesser extent to the tank inlet cover body.

In other words, the damping means are predominantly designed for the purpose of advantageously changing the structure-borne noise propagation within the tank inlet cover, so that the stop noise during closing or opening of the tank inlet cover is only still perceptible to a lesser extent in comparison to the prior art.

According to an embodiment, it is provided that the counter stop element has a counter stop surface or a counter stop point, with which the tank inlet cover comes into the contact position upon reaching a closed position and/or open position with the end stop of the tank inlet cover groove.

It is particularly provided in this case that the counter stop surface is implemented as separated from the tank inlet cover body by at least one barrier. The barrier which is provided between counter stop surface or between counter stop element and tank inlet cover body is implemented in such a manner that it extensively prevents a structure-borne noise transmission between the tank inlet cover body and a counter stop element or its counter stop surface, or at least minimizes and damps this transmission in comparison to the prior art. The barrier particularly prevents propagation of strike-induced or impact-induced oscillations originating from the counter stop surface.

According to another embodiment, it is additionally provided that the counter stop surface is essentially acoustically decoupled by at least one slot from the surface of the tank inlet cover body. The barrier between tank inlet cover body and counter stop surface is therefore implemented as a slot or as an interruption or perforation in the surface of the tank inlet cover body, which represents a nearly insurmountable barrier for the structure-borne noise induced during the mutual impacts of stop and counter stop element.

A slotted or otherwise suitably implemented interruption in the surface of the tank inlet cover body can additionally be created using particularly simple means and using few processing steps, without additional material demand arising for this purpose. In contrast, through the implementation of a slot or comparable recesses in the interior of the tank inlet cover body or the counter stop element, the total weight of the tank inlet cover can even be reduced, although only insignificantly.

According to a further embodiment, it is provided that the at least one recess at least sectionally has an essentially linear, convexly curved, concavely curved, and/or corrugated, approximately sinusoidal shape.

Furthermore, it can be provided that the at least one recess, which is preferably implemented like a slot, at least partially bounds the counter stop surface to the outside. In this context, "to the outside" means bounding of the counter stop surface within the plane of the tank inlet cover body. It is particularly provided that the tank inlet cover body is integrally connected to the counter stop element, even the surface of the tank inlet cover body oriented toward the vehicle interior being able to merge smoothly into the counter stop surface, except for the recess.

According to a further embodiment, multiple recesses, which are spaced apart from one another and run diagonally or perpendicularly to one another, are provided in the area of the counter stop element. The individual, preferably slotted recesses may also be implemented as merging into one another, for example.

According to a further embodiment, the at least one recess has a shape like a semicircle or pitch circle or is essentially U-shaped or V-shaped. Extensive acoustic decoupling of counter stop surface and tank inlet cover body can be achieved in particular by a design of the recess like a pitch circle, approximately like three quarters of a circle, or as U-shaped.

According to another embodiment, it is further provided that the length, the width, the shape, the positioning, and/or the orientation of the at least one recess is optimized with respect to maximum suppression of structure-borne noise propagation originating from the counter stop surface. Depending on the material used for the tank inlet cover and the tank inlet cover body and depending on the geometric design of the tank inlet cover body and the counter stop element, the best possible damping of the structure-borne noise propagation can be achieved in each case through targeted dimensioning and geometric design of the at least one recess.

It is particularly provided that the recess which forms a structure-borne noise propagation barrier is implemented as a slot.

According to a further embodiment, the counter stop element is situated on an end section diametrically opposite to the pivot axis of the tank inlet cover. Counter stop element and stop element are accordingly provided for noise damping of a closing movement of the tank inlet cover. However, it can also be provided in a corresponding manner that the counter stop element is provided in the area of or adjacent to the pivot axis. In the case of such a design, the interaction of stop and counter stop elements would damp or extensively suppress a noise arising during an opening movement of the tank inlet cover.

Furthermore, it is provided according to an embodiment that the counter stop element protrudes radially in relation to the pivot axis from an end section of the tank inlet cover body diametrically opposite to the pivot axis. The counter stop element forms a type of pin protruding from a radial delimitation of the tank body. Furthermore, it can be provided that the tank inlet cover body has at least one fastener or a corresponding receptacle, which are provided for fastening a vehicle body panel which comes to rest on the outer side of the tank inlet cover.

Furthermore, according to another embodiment relates to a tank inlet cover module for installation in a motor vehicle. The tank inlet cover module has a tank inlet cover groove and a tank inlet cover mounted thereon so it is pivotable. The tank inlet cover groove has a base section, which is on the interior in its final installed position on the motor vehicle and is provided with a passage opening for a fuel filling nozzle. Laterally to this passage opening, the tank inlet cover groove typically has a receptacle section for the pivotable mounting of the tank inlet cover. Furthermore, a stop element is implemented on the tank inlet cover groove, which interacts with the above-described counter stop element of the tank inlet cover when the tank inlet cover is transferred into its closed and/or open position.

The stop element can be connected in a formfitting, friction-locked, or materially bonded manner to the groove body or even implemented integrally therewith. The groove body itself is preferably implemented as a plastic injection-molded component. Elastically deformable materials, such as thermoplastic elastomers and natural or synthetic rubber, are provided for the stop element.

Finally, a motor vehicle is provided having a tank inlet cover module according to an embodiment.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
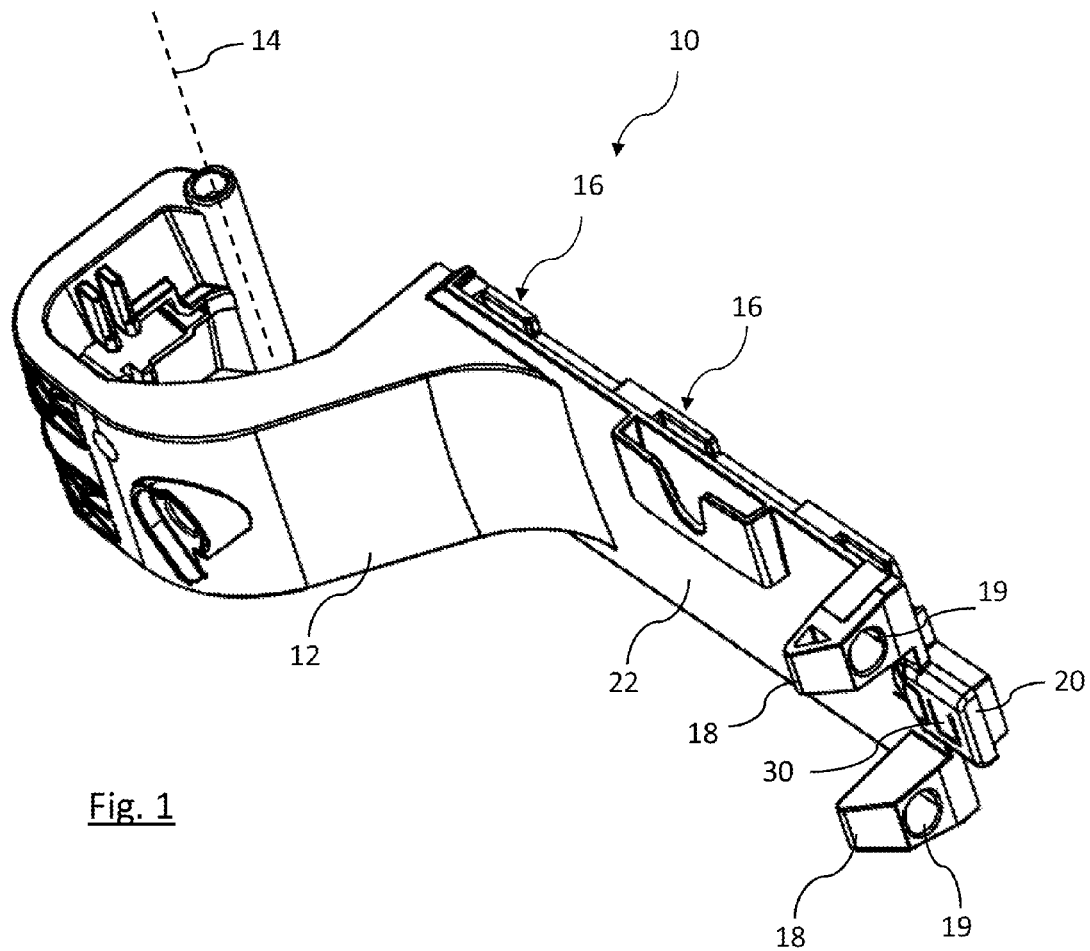
FIG. 1 shows a perspective and isolated illustration of a tank inlet cover, without vehicle body panel.
Figure 2:
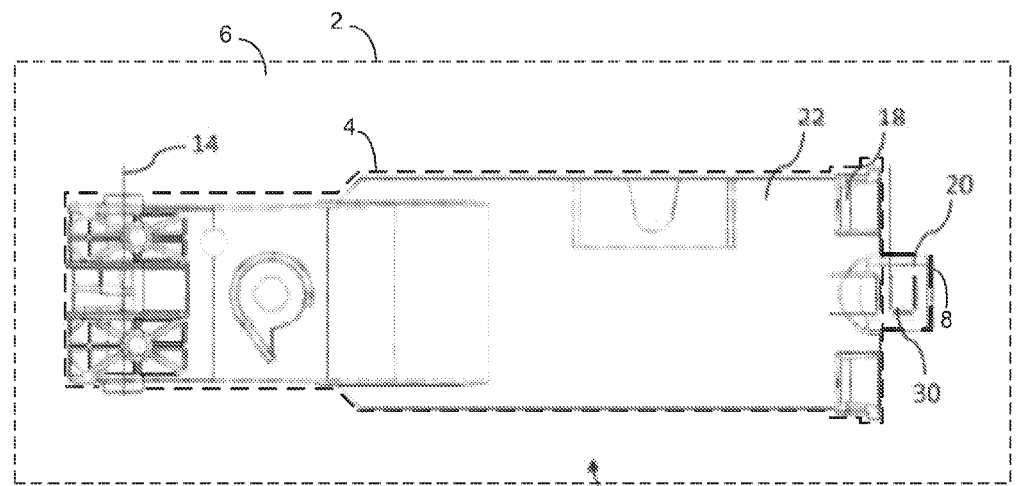
FIG. 2 shows a top view from the inside of the tank inlet cover according to FIG. 1.
Figure 3:
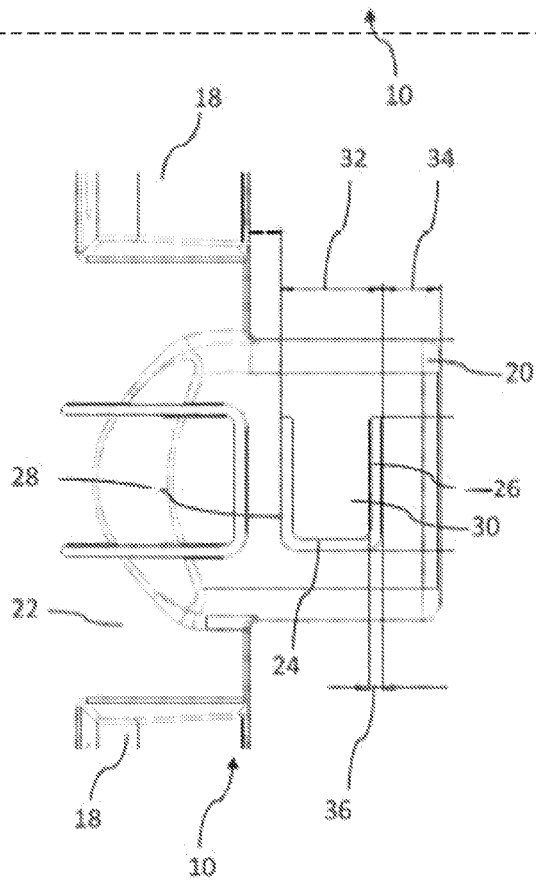
FIG. 3 shows an enlarged illustration of the counter stop element of the tank inlet cover according to FIG. 2.

The tank inlet cover 10, which is shown isolated and sometimes only partially in FIG. 1 to FIG. 3, has a pivot arm 12 implemented essentially as an S-curve, which is mounted so it is pivotable at one end on a pivot axis 14 on a tank inlet cover groove. At the other end, the pivot arm 12 runs out into an essentially planar tank inlet cover body 22. The tank inlet cover body 22 has a pin-like counter stop element 20, which protrudes radially in relation to the pivot axis 14, on its end section diametrically opposite to the pivot axis 14. A schematic representation is provided in FIG. 2 of the tank inlet cover groove 4 in body panel 6 that forms module 2. A schematic representation of an end stop 8 of the tank inlet cover groove 4 is also depicted in FIG. 2.

In relation to the axial direction of the pivot axis 14, the counter stop element 20 is situated between two locking elements 18, which extend in the peripheral direction in relation to the pivot axis 14. The two locking elements 18, which are implemented essentially identically, extend essentially parallel to the surface normals of the tank inlet cover body 22.

On their free end sections, they have an insertion bevel and, downstream therefrom, a receptacle 19 in each case, for example, for a closing bolt of a closing mechanism situated on the tank inlet cover module.

On the upper side of the tank inlet cover body 22, receptacle elements 16, which are offset to one another, are provided, for example, for fastening a vehicle body panel, which is not explicitly shown in the figures, which runs flush with the surface with the surrounding external vehicle body in the closed position of the flap, however.

The tank inlet cover 10 or its counter stop element 20 has a counter stop surface 30. This is extensively acoustically decoupled from the tank inlet cover body 22 by a U-shaped slot 24, 26, 28, as shown in the illustration of FIG. 2 and FIG. 3. The three individual slots 24, 26, 28 merge into one another to form a U-shape overall. They also represent a delimitation or area bounding of the counter stop surface 30 in relation to the tank inlet cover body 22.

The size of the counter stop surface 30 is selected so that a stop provided on the groove side, which is not explicitly shown in the figures, completely and exclusively comes to rest in the area of the counter stop surface 30 upon closing of the tank inlet cover 10. As a result, the counter stop surface 30 is exclusively excited to oscillations upon striking of the tank inlet cover 10.

However, the structure-borne noise propagation within the tank inlet cover body 22, which originates from the counter stop surface 30, can be significantly reduced by the U-shaped slot 24, 26, 28, so that in the final effect, noises which are perceptible as a result of the striking of the tank inlet cover 10 are only still are separable to a lesser extent in comparison to the prior art. However, the noise characteristic at least changes sufficiently that the striking noise has a much less irritating effect on the end-user.

As is recognizable on the basis of the enlarged illustration of FIG. 3, the three individual slots 24, 26, 28, which form a U-shaped slot, have a slot width 36. The two lateral slots 26, 28 have a distance 32 from one another, the outer slot 26 being situated at a distance 34 from the outer edge of the counter stop element 20. The distances and slot sizes 32, 34, 36 shown in FIG. 3 may be implemented as noise-optimized or to reduce structure-borne noise propagation depending on the material selection for the counter stop element or the tank inlet cover body and the stop element, which is not explicitly shown.

Figure 4:
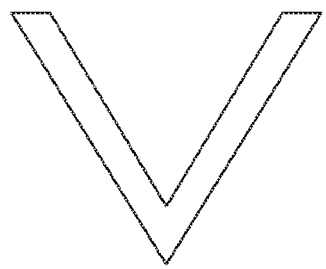
FIGS. 4-7 show alternate exemplary embodiments of recesses on the counter stop element.
Figure 5:
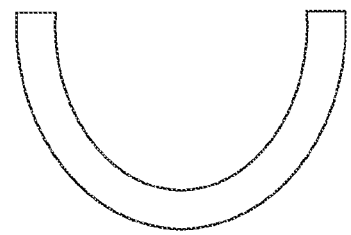
Figure 6:
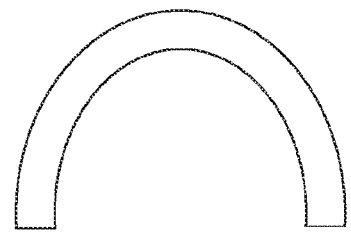
Figure 7:
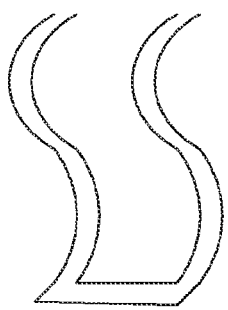

Furthermore, in addition to a U-shaped slot in the counter stop element 20 as shown here, other geometries and shapes of slotted areas, for example, like pitch circles or semicircles and V-shaped or interrupted slotted, perforated, and similar shapes are conceivable. As examples, FIG. 4 shows a V-shaped or diagonal slots; FIG. 5 shows a convex slots; FIG. 6 shows concave slots; and FIG. 7 shows corrugated slots.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A tank inlet cover for a tank inlet cover module with a tank inlet cover groove having an end stop, the inlet tank cover module being installable in a motor vehicle, the tank inlet cover comprising:
   a mount pivotally mounting the tank inlet cover in the tank inlet cover groove such that the end stop limits a pivot movement of the tank inlet cover;
   a tank inlet cover body coupled to the mount; and
   a counter stop element coupled to the tank inlet cover body, the tank inlet cover body and the counter stop element being configured to interact with the end stop of the tank inlet cover groove via a counter stop surface; and
   a damping device configured to dampen a structure-borne noise propagation between the counter stop element and the tank inlet cover body,
   wherein the counter stop surface is acoustically damped by at least one recess from a surface of the tank inlet cover body.

2. The tank inlet cover according to claim 1, wherein the tank inlet cover reaches a contact position with the end stop of the tank inlet cover groove upon reaching a position via the counter stop surface that is provided in an area of the counter stop element.

3. The tank inlet cover according to claim 1, wherein the recess at least sectionally comprises an essentially linear shape.

4. The tank inlet cover according to claim 1, wherein the recess at least partially delimits the counter stop surface.

5. The tank inlet cover according to claim 1, wherein the at least one recess is a plurality of recesses in an area of the counter stop element, the plurality of recesses are spaced apart from one another.

6. The tank inlet cover according to claim 5, wherein the plurality of recesses have a semicircle shape.

7. The tank inlet cover according to claim 1, wherein a length of the recess is optimized with respect to maximum suppression of the structure-borne noise propagation that originates from the counter stop surface.

8. The tank inlet cover according to claim 1, wherein the counter stop element is situated on an end section that is diametrically opposite to a pivot axis of the tank inlet cover.

9. The tank inlet cover according to claim 8, wherein the counter stop element protrudes radially in relation to the pivot axis from a second end section of the tank inlet cover body diametrically opposite to the pivot axis.

10. The tank inlet cover according to claim 1, wherein the tank inlet cover body comprises a receptacle element configured to fasten a vehicle body panel that comes to rest on the outer side of the tank inlet cover.

11. The tank inlet cover according to claim 2, wherein the position is a closed position.

12. The tank inlet cover according to claim 1, wherein the counter stop surface is essentially acoustically isolated by the at least one recess from a surface of the tank inlet cover body.

13. The tank inlet cover according to claim 5, wherein the plurality of recesses run diagonally to one another.

14. The tank inlet cover according to claim 5, wherein the plurality of recesses run perpendicularly to one another.

15. The tank inlet cover according to claim 1, wherein the recess at least sectionally comprises an essentially convexly curved shape.

16. The tank inlet cover according to claim 1, wherein the recess at least sectionally comprises an essentially concavely curved shape.

17. The tank inlet cover according to claim 1, wherein the recess at least sectionally comprises an essentially corrugated shape.

18. The tank inlet cover according to claim 5, wherein the plurality of recesses is essentially U-shaped.

19. The tank inlet cover according to claim 5, wherein the plurality of recesses is essentially V-shaped.

* * * * *